Dec. 13, 1966     A. G. BODINE     3,291,957
METHOD AND APPARATUS FOR REMOVAL OF INSULATION
COATING OF PARTS IN SPOT WELDING
Filed Oct. 12, 1965
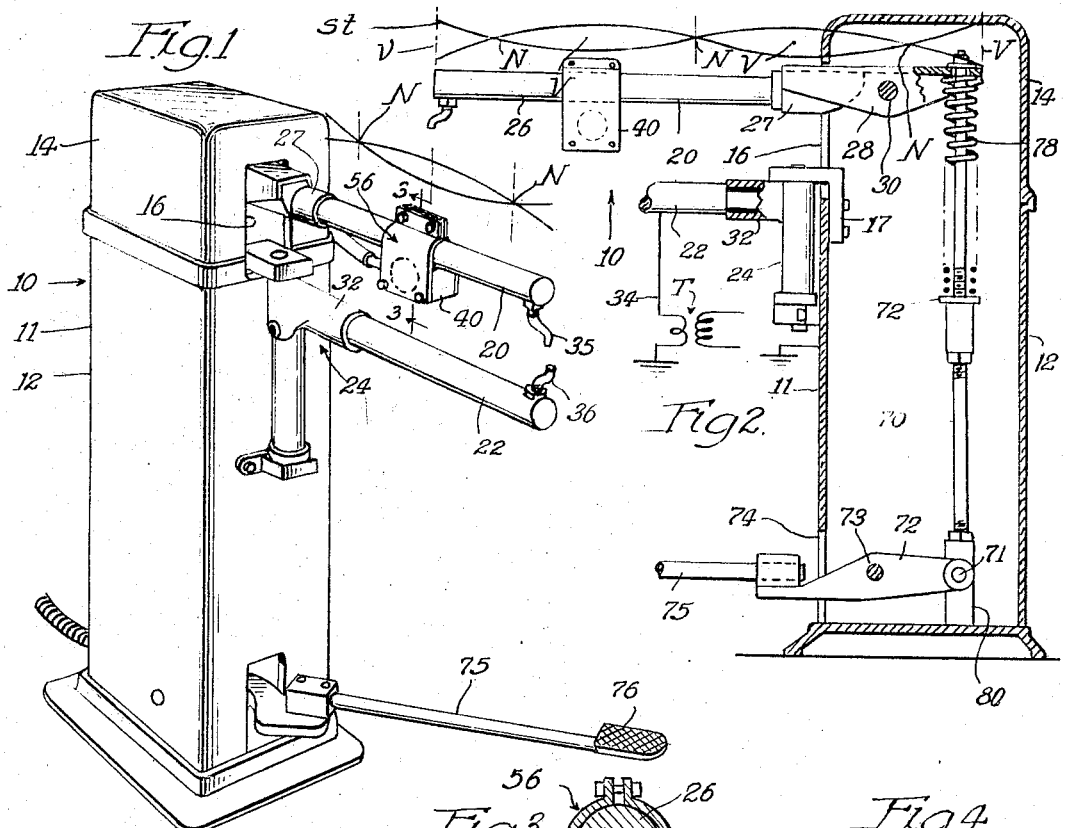
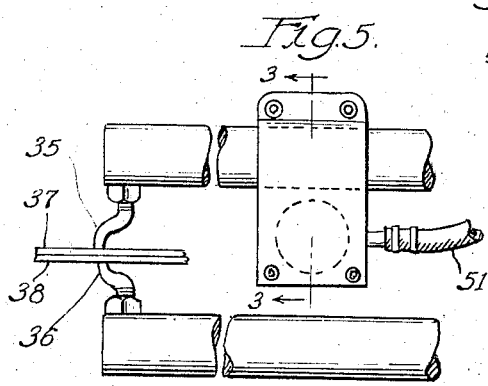
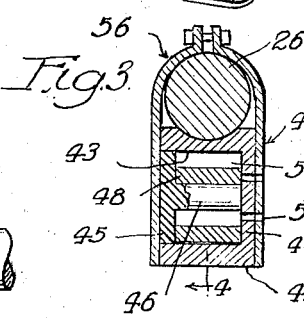
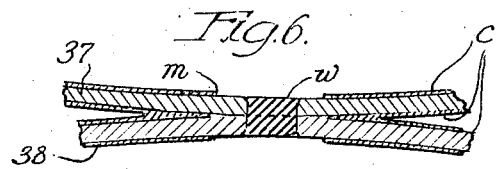
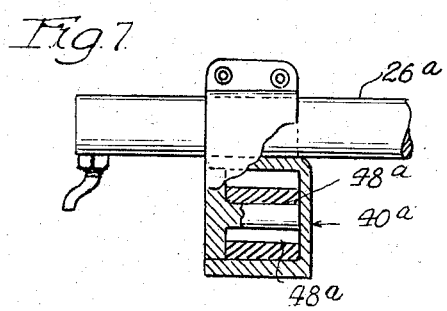
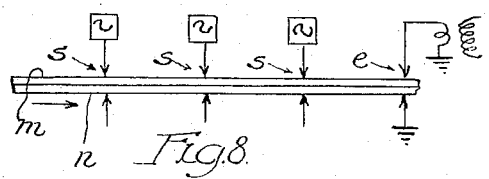
INVENTOR.
Albert G. Bodine
BY
Forrest Lilly
Attorney United States Patent Office 3,291,957
Patented Dec. 13, 1966

3,291,957
METHOD AND APPARATUS FOR REMOVAL OF INSULATION COATING OF PARTS IN SPOT WELDING
Albert G. Bodine, Los Angeles, Calif.
(7877 Woodley Ave., Van Nuys, Calif.)
Filed Oct. 12, 1965, Ser. No. 495,157
7 Claims. (Cl. 219—86)

This invention relates generally to the art of spot-welding, and is directed to improvements therein comprising the application of sonic vibrations to the parts to be spot-welded as an adjunct to the welding process, so as to quickly remove coatings of various kinds, such as rust preventitive coatings, which otherwise hinder the spot-welding operation.

It is well known that many coatings used on parts are electrically insulating in character, and that these coatings thus interfere with the spot-welding operation unless removed by a preliminary cleaning or scraping operation.

An object of the present invention is to incorporate within the spot-welding machine a means which will effectively remove such coatings from the electrical contact areas of the parts to be spot-welded, as an integrated step in the spot-welding process.

The invention is based upon the discovery that a sonic vibrator or oscillator, especially and preferably one of a special gyratory or orbiting mass type, is effective to deliver large sonic energy to and into the concentrated or restricted areas of contact of the two parts to be welded, both with one another, and with the welding electrodes, causing a violent sonic vibration of these parts while they are being held against one another by the welding electrodes, and consequently rapidly tearing away of the surface coatings on both parts, so that they come into metal-to-metal contact, both with one another, and with the welding electrodes, just prior to the flashing of the spot-welding current through the contact region. The sonic vibrations can be continued while the spot-weld is being formed by the electric current. This sonic vibration can be applied either directly to one or both of the electrodes, or directly to the parts themselves, but in any event so as to deliver intense sonic energy violently into the contacting areas of the two parts to be welded together.

The orbiting mass type of sonic oscillator is of unique value in the practice of the invention in that it adapts itself to changes in surface conditions on the parts as the parts are cleaned and welded together, or as the spot-welder electrodes are applied to areas of the parts to be welded of differing mass and elasticity characteristics, such as may vary the acoustic loading of the sonically vibratory apparatus. This automatic accommodation feature of the orbiting mass type of oscillator also adapts the welding machine to parts of widely varying characteristics of mass and elasticity, assuring good energy delivery into the parts under a wide range of working conditions encountered in practice. This especially useful adapting characteristic of the orbital mass type of generator will be spoken of further hereinafter. Before temporarily leaving the subject, however, it is emphasized again that the orbiting mass type of generator maintains the sonic activity at a very high energy level under the progressively changing surface condition as the coating is removed, with the result of rapidly tearing the coatings off the parts and thus obtaining intimate metal-to-metal contact for the short time interval that the spot-weld electric current is flashed through the contact area. The inherent high-power output characteristic of this type of oscillator is especially and uniquely effective here, in that a high sonic energy level is, in practice, of high importance in order to finish the "sonic fluxing" in a short time interval in relation to the usual short time duration of the electric flash of the welding cycle. It should be evident that a long sonic time interval prior to the electric welding interval, would be a substantial disadvantage in that it would impede and slow down the spot-welding process.

In accordance with a preferred form of the invention, one of the welding electrodes is mounted on the vibratory, velocity antinode region of an elastic resonator in the form of a laterally vibratory elastic bar, which is set into sonic vibration by setting up a lateral resonant standing wave therein. This standing wave is set up in the bar by means of a sonic vibrator or oscillator, preferably of the orbiting mass type, acoustically coupled to the vibratory bar at a region of maximized vibration of the standing wave, i.e. at a velocity antinode thereof. A sonic vibratory device of such character can be incorporated easily in an otherwise largely conventional spot-welding machine, and becomes of very great benefit and advantage in the carrying out of the spot-welding process.

The invention depends upon certain concepts in the art of acoustics, and these are necessary to understand quite fully in order that the nature and benefits of the invention be fully comprehended. Accordingly, there follows a discussion of certain sonic theory which will facilitate acquisition of a good background understanding of the invention.

Certain acoustic phenomena disclosed in the foregoing and hereinafter, are, generally speaking, outside the experience of those skilled in the acoustics art. To aid in a full understanding of these phenomena by those skilled in the acoustics art, and by others, the following general discussion, including definition of terms, is deemed to be of importance.

By the expression "sonic vibration" I mean elastic vibrations, i.e., cyclic elastic deformations, such as longitudinal, lateral, gyratory, torsional, etc., generated in a structure, or which travel through a medium with a characteristic velocity of propagation. If these vibrations travel longitudinally, or create a longitudinal wave pattern in a medium or structure having uniformly distributed constants of elasticity and mass, this is sound wave transmission. Regardless of the vibratory frequency of such sound wave transmission, the same mathematical formulae apply, and the science is called sonics. In addition, there can be elastically vibratory systems wherein the essential features of mass appear as a localized influence or parameter, known as a "lumped constant"; and another such lumped constant can be a localized or concentrated elastically deformable element, affording a local effect referred to variously as elasticity, modulus, modulus of elasticity, stiffness, stiffness modulus, or compliance, which is the reciprocal of the stiffness modulus. Fortunately, these constants, when functioning in an elastically vibratory system such as mine, have cooperating and mutual influencing effects like equivalent factors in alternating-current electrical systems. In fact, in both distributed and lumped constant systems, mass is mathematically equivalent to inductance (a coil); elastic compliance is mathematically equivalent to capacitance (a condenser); and friction or other pure energy dissipation is mathematically equivalent to resistance (a resistor).

Because of these equivalents, my elastic vibratory systems with their mass and stiffness and energy consumption, and their sonic energy transmission properties, can be viewed as equivalent electrical circuits, where the functions can be expressed, considered, changed and quantitatively analyzed by using well proven electrical formulae.

It is important to recognize that the transmission of sonic energy into the interface or work area between two parts to be moved against one another requires the above mentioned elastic vibration phenomena in order to accomplish the benefits of my invention. There have been other proposals involving exclusively simple bodily vibration of some part. However, these latter do not result in the benefits of my sonic or elastically vibratory action.

Since sonic or elastic vibration results in the mass and elastic compliance elements of the system taking on these special properties akin to the parameters of inductance and capacitance in alternating current phenomena, wholly new performances can be made to take place in the mechanical arts. The concept of acoustic impedance becomes of paramount importance in understanding performances. Here impedance is the ratio of cyclic force or pressure acting in the media to resulting cyclic velocity or motion, just like the ratio of voltage to current. In this sonic adaptation impedance is also equal to media density times the speed of propagation of the elastic vibration.

In this invention impedance is important to the accomplishment of desired ends, such as where there is an interface. A sonic vibration transmitted across an interface between two media or two structures can experience some reflection, depending upon differences of impedance. This can cause large relative motion, if desired, at the interface.

Imepedance is also important to consider if optimized energization of a system is desired. If the impedances are adjusted to be matched somewhat, energy transmission is made very effective.

Sonic energy at fairly high frequency can have energy effects on molecular or crystalline systems. Also, these fairly high frequencies can result in very high periodic acceleration values, typically of the order of hundreds or thousands of times the acceleration of gravity. This is because mathematically acceleration varies with the square of frequency. Accordingly, by taking advantage of this square function, I can accomplish very high forces with my sonic systems. My sonic systems preferably accomplish such high forces, and high total energy, by using a type of orbiting mass sonic vibration generator taught in my Patent No. 2,960,314, which is a simple mechanical device. The use of this type of sonic vibration generator in the sonic system of the present invention affords an especially simple, reliable, and commercially feasible system.

An additional important feature of these sonic circuits is the fact that they can be made very active, so as to handle substantial power, by providing a high "Q" factor. Here this factor Q is the ratio of energy stored to energy dissipated per cycle. In other words, with a high Q factor, the sonic system can store a high level of sonic energy, to which a constant input and output of energy is respectively added and subtracted. Circuit-wise, this Q factor is numerically the ratio of inductive reactance to resistance. Moreover, a high Q system is dynamically active, giving considerable cycle motion where such motion is needed.

Certain definitions should now be given:

Impedance, in an elastically vibratory system, is, mathematically, the complex quotient of applied alternating force and linear velocity. It is analogous to electrical impedance. The concise mathematical expression for this impedance is $$Z = R + \sqrt{-1}\left(2\pi f M - \frac{1}{2\pi f C}\right)$$

where M is vibratory mass, C is elastic compliance (the reciprocal of stiffness, or of modulus of elasticity) and $f$ is the vibration frequency.

Resistance is the "real" part R of the impedance, and represents energy dissipation, as by friction.

Reactance is the "imaginary" part of the impedance, and is the difference of mass reactance and compliance reactance.

Mass reactance is the positive imaginary part of the impedance, given by $2\pi f M$. It is analogous to electrical inductive reactance, just as mass is analogous to inductance.

Elastic compliance reactance is the negative imaginary part of impedance, given by $1/2\pi f C$. Elastic compliance reactance is analogous to electrical capacitative reactance, just as compliance is analogous to capacitance.

Resonance in the vibratory circuit is obtained at the operating frequency at which the reactance (the algebraic sum of mass and compliance reactances) becomes zero. Vibration amplitude is limited under this condition by resistance alone, and is maximized. The inertia of the mass elements necessary to be vibrated does not under this condition consume any of the driving force.

A valuable feature of my sonic circuit is the provision of enough extra elastic compliance reactance so that the mass or inertia of various necessary bodies in the system does not cause the system to depart so far from resonance that a large proportion of the driving force is consumed and wasted in vibrating this mass. For example, a mechanical oscillator or vibration generator of the type normally used in my inventions always has a body, or carrying structure, for containing the cyclic force generating means. This supporting structure, even when minimal, still has mass, or inertia. This inertia could be a force-wasting detriment, acting as a blocking impedance using up part of the periodic force output just to accelerate and decelerate this supporting structure. However, by use of elastically vibratory structure in the system, the effect of this mass, or the mass reactance resulting therefrom, is counteracted at the frequency for resonance; and when a resonant acoustic circuit is thus used, with adequate capacitance (elastic compliance reactance), these blocking impedances are tuned out of existence, at resonance, and the periodic force generating means can thus deliver its full impulse to the "work," which is the resistive component of the impedance.

Sometimes it is especially beneficial to couple the sonic oscillator at a low-impedance (high-velocity vibration) region, for optimum power input, and then have high impedance (high-force vibration) at the work point. The sonic circuit is then functioning additionally as a transformer, or acoustic lever, to optimize the effectiveness of both the oscillator region and the work delivering region.

For very high impedance systems having high Q at high frequency, I sometimes prefer that the resonant elastic system be a bar of solid material such as steel. For lower frequency or lower impedance, especially where large amplitude vibration is desired, I use a fluid resonator. One desirable specie of my invention employs, as the source of sonic power, a sonic resonant system comprising an elastic member in combination with an orbiting mass oscillator or vibration generator, as above mentioned. This combination has many unique and desirable features. For example, this orbiting mass oscillator has the ability to adjust its input power and phase to the resonant system so as to accommodate changes in the work load, including changes in either or both the reactive impedance and the resistive impedance. This is a very desirable feature in that the oscillator "hangs on" to the load even as the load changes.

It is important to note that this uniquie advantage of the orbiting mass oscillator accrues from the combination thereof with the acoustic resonant circuit, so as to comprise a complete acoustic system. In other words, the orbiting mass oscillator is matched up to the resonant part of its system, and the combined system is matched up to the acoustic load, or the job to be accomplished. One manifestation of this proper matching is a characteristic whereby the orbiting mass oscillator tends to "lock in" to the resonant frequency of the resonant part of the system.

The combined system has a unique performance which is exhibited in the form of a greater effectiveness and particularly greater persistence in a sustained sonic action as the work process proceeds or goes through phases and changes of conditions. The orbiting mass oscillator, in this matched-up arrangement, is able to hang on to the load and continue to develop power as the sonic energy absorbing environment changes with the variations in some energy absorbtion by the load. The orbiting mass oscillator automatically changes its phase angle, and therefore its power factor, with these changes in the resistive impendance of the load.

A further important characteristic which tends to make the orbiting mass oscillator hang on to the load and continue the development of effective power, is that it also accommodates for changes in the reactive impedance of the acoustic environment while the work process continues. For example, if the load tends to add either inductance or capacitance to the sonic system, then the orbiting mass oscillator will accommodate accordingly. Very often this is accommodated by an automatic shift in frequency of operation of the orbiting mass oscillator by virtue of an automatic feedback of torque to the energy source which drives the orbiting mass oscillator. In other words, if the reactive impedance of the load changes this automatically causes a shift in the resonant response of the resonant circuit portion of the complete sonic system. This in turn causes a shift in the frequency of the orbiting mass oscillator for a given torque load provided by the power source which drives the orbiting mass oscillator.

All of the above mentioned characteristics of the orbiting mass oscillator are provided to a unique degree by this oscillator in combination with the resonant circuit. As explained elsewhere in this discussion the kinds of acoustic environment presented to the sonic source by this invention are uniquely accommodated by the combination of the orbiting mass oscillator and the resonant system. As will be noted, this invention involves the application of sonic power which brings forth some special problems unique to this invention, which problems are primarily a matter of delivering effective sonic energy to the particular work process involved in this invention. The work process, as explained elsewhere herein, presents a special combination of resistive and reactive impedances. These circuit values must be properly met in order that the invention be practiced effectively.

The drawings show representative or illustrative embodiments of the invention, wherein:

FIG. 1 is a perspective view of a spot-welding machine equipped with the improvements of the present invention;

FIG. 2 is a longitudinal medial section through the spot-welding machine of FIG. 1;

FIG. 3 is a detail section through the oscillator, taken in accordance with the line 3—3 on FIG. 1;

FIG. 4 is a tranverse section taken on line 4—4 of FIG. 3;

FIG. 5 is an elevational view showing the outer portions of the arm of the spot-welding machine in side elevation, together with the oscillator clamped to the upper arm thereof;

FIG. 6 is a sectional view through two plates which have been spot-welded in face-to-face contact with one another, and illustrating the removal of the coating of these plates around the area of the spot-weld;

FIG. 7 is a fragmentary view similar to a portion of FIG. 5 but showing a modification; and FIG. 8 is a diagrammatic representation of a modification.

Referring now to the drawings, the numeral 10 designates generally a spot-welding machine having an upright housing 11. This housing 11 comprises, in the present embodiment, two main parts, a lower part 12 which may stand on the floor, and an upper part 14 which is flange fitted to part 12, for example in the manner well illustrated in FIGS. 1 and 2, or in any other fashion desired.

One side wall of the upper housing part 14 is slotted vertically from its lower edge to form a window 16, and projecting horizontally through said window is the upper arm or bar 20 of the spot-welding machine. Immediately below and substantially parallel to the upper arm or bar 20 is the lower arm or bar 22 of the machine, and said arm or bar 22 is mounted on the lower portion 12 of the housing 11 in any suitable or convenient manner, as by the fixture generally designated by reference numeral 24. The arm 20 comprises in this instance an electrically conductive rod 26, composed of a hard, copper or aluminum alloy, of good elastic properties, and capable of elastic vibration in a lateral standing wave mode. The rod 26 is received in a socket member 27, which is in turn affixed to a fixture 28 pivotally mounted on a transverse shaft 30 which is supported through suitable means, not specifically shown, from the side walls of the housing part 14. As here shown, the fixture 28 is of an inverted channel shape in cross-section, and is pivotally mounted at its center point on the shaft 30, so that it extends horizontally in both directions from the shaft 30 through an appreciable distance, as shown. It may be fabricated by stamping, and as formed, possesses elasticity, as does the socket member 27, so that these parts can participate in elastic standing wave vibration.

The lower arm 22 comprises an electrically conductive rod, such as of copper, aluminum, or a suitable alloy, received in a socket 32 forming a part of the aforementioned fixture 24. An insulation sleeve 33 can be used to insulate the rod 22 from the fixture 24.

Electric power is supplied from a suitable step-down transformer T whose primary is fed by power mains and whose low-voltage secondary may be connected at one side, as by lead 34, to conductive bar 22, and the other side to ground. Switching means for the electric circuit are not shown, but can be readily arranged by those skilled in the art in accordance with techniques now well known.

The arms 20 and 22 carry at their forward extremities opposed spot-welding electrodes 35 and 36, respectively, whose tips engage opposite sides of a pair of members or work pieces 37 and 38 placed in contact therebetween. These electrodes are conventional and need not be further described. The electrodes and arms 20 and 22 can be furnished with conventional means, not shown, for circulating coolant thereto.

Returning to a consideration of the upper arm 20, it will be seen that the socket member 27 and the fixture 28 form a rearward extension thereof, and a vibration generator or oscillator, here designated by numeral 40, is acoustically coupled to this arm 20 so as to produce a pattern of elastic vibrations therein, in this case a lateral resonant standing wave pattern, such as diagrammed at *st* in FIGS. 1 and 2.

The generator 40 is preferably of an orbiting mass type such as disclosed in several forms in my Patent No. 2,960,314. A simple form of this vibration generator, driven by air under pressure, is shown in the present drawings, reference being had particularly to FIGS. 3 and 4. As shown, the generator 40 has a generally rectangular housing 42 formed with a cylindrical bore 43. The bore 43 extends inwardly to a side wall 44, and the other end of the bore is closed by a circular plate 45 having an axial shaft 46 whose extremity is received and supported in a suitable aperture in the wall 44, as clearly shown in FIG. 3. Surrounding the shaft 46 is a cylindric inertia ring 48, having a bore of considerably larger diameter than the diameter of the pin 46, and an outside diameter such that its outer circumference just slightly clears the wall of the bore 43. The ring 48 has slight end-clearance with the plate 45 and the wall 44 forming the end of walls of the chamber 50 occupied by the ring.

The ring 48, which constitutes the orbiting mass or rotor of the oscillator, is driven to whirl or gyrate about the axial pin or shaft 46 by a jet of air injected from an air hose 51 through a convergent nozzle 52 formed in the housing 42 (FIG. 4) and opening tangentially into the bore 43. It will be seen that the air injected via the nozzle 52 impinges on the ring 48, and causes it to spin on the shaft 46, the spent air discharging as via passageways 52a. It will also be seen that thereby, a gyrating force, or in another manner of speaking, a rotating force vector, acts on the shaft 46, and therefore on the generator housing 42 in which the shaft 46 is firmly fixed. Thus, a gyratory force, or rotating force vector, acts on the housing 42 at an effective center axis thereof, which is the axis of the shaft 46. This rotating force vector is of course applied and transmitted to any device to which the housing 42 of the oscillator may be firmly attached.

As shown in the drawings, the housing 42 is in this case attached directly against the underside of the rod 26 by clamp strap means 56 generally designated at 56.

The air hose 51 feeding the oscillator will be understood to lead from a suitable source of air under pressure and a control valve, not shown, whereby air under controllable pressure can be fed to the oscillator to operate the latter at the desired frequency, which is the frequency for resonant vibration of the arm 20.

It will be seen that the oscillator 40 has been clamped to the shaft 26 in such an orientation that the spin axis of the rotor 48 extends transversely of the arm 20. Accordingly, the gyratory force applied from the oscillator to the rod 26 has two components, one longitudinally of the rod 26, and one transversely thereof. The arm 20 being horizontally disposed in this case, the transverse force component is accordingly vertical, and the presently described standing wave pattern is thus oriented in the vertical plane.

Various resonant lateral standing wave patterns can be set up in the arm 20, but that here shown is typical and preferred. The standing wave pattern st will be seen to have spaced nodes N and velocity antinodes V with a velocity antinode at each extremity and at two intervening locations, with nodes N at positions between the antinodes. The generator 40, in order to produce this wave pattern, is coupled to the bar 20 at a point therealong which undergoes substantial vertical vibration when vibrating in the assumed standing wave pattern; and preferably, for most effective drive, of course, the vibration generator 40 is connected to the arm 20 at the location of a velocity antinode. In this instance, the oscillator 40 is connected to the arm 20 at the velocity antinode V which is next inside the forward node N. The oscillator must then be driven at the resonant frequency for the sought standing wave pattern.

The creation of such a standing wave pattern as is diagrammed at st will be understood by those skilled in the art. Suffice it to say that the pattern is created when the oscillator delivers a vertically oriented component of force at the resonant frequency of the elastic arm 20 for the lateral standing wave mode or pattern diagrammed at st. Also in this general connection, it will be understood by those skilled in the art, that the pattern extending entirely along the full length of the arm 20, inclusive of the rod 26, the socket 27 and the fixture 28, the latter two components must also for the idealized case be of elastic material, and thus capable of transverse elastic bending. When such is the case, a single standing wave pattern can be established from one extremity of the arm 20 to the other. The pattern st will be understood to be somewhat idealized, as shown in the present drawings, and in practice will be modified to an extent by lumped constant effects in the regions of the socket 27 and fixture 28. These however are of no special consequence and need not be further considered herein. It is of importance to note, however, that the pivotal mounting shaft 30 of the arm 20, which is the principal mounting point of the swinging arm 20, does act to establish the location of a node of the standing wave.

The rearward extremity of the arm 20 has connected thereto a vertical link 70, the lower end of which is pivotally connected at 71 to a lever 72 fulcrumed at 73 on suitable mounting means, not shown, but understood to be supported by the housing part 12. The outer extremity of the lever 72 projects through a housing window 74 and has mounted thereon a rod 75 terminating in a foot pedal 76. In the machine shown, a coil compression spring 78 surrounds an upper portion of the link 70, engaging upwardly at its upper end against the rearward extremity of the fixture 28, and being supported at its lower end on a shoulder 79 carried by the link 70. The linkage stands normally in the position shown in FIGS. 1 and 2, with the electrodes separated, held there yieldingly by a bias weight 80 on link 70.

When the pedal 76 is depressed, the link 70 will be elevated, swinging the arm 20 on pivotal mounting shaft 30 to lower the forward extremity of the arm 20 and the upper electrode carried thereby, so as to engage the latter with the upper work piece 37, as in FIG. 5. Further depression of the pedal 76 then simply compresses the spring 78, adding spring pressure to the engagement of the electrodes with the work pieces, and thus holding the work pieces in firm contact with each other as well as with the electrodes. In some spot-welding machines having such a pedal and linkage arrangement, the electrical current is automatically switched on when the pedal is depressed sufficiently to place the work pieces under satisfactory pressure for welding. For example, a limit switch may be employed. For present purposes, however, the electric current is preferably not switched on until the sonic vibration cycle is completed. Accordingly, when proper pressure has been applied to the work pieces, the sonic oscillator is turned on, either manually or automatically, and after a short time interval necessary to complete the coating removal step, the electric current is switched on, either manually or automatically. It will be clear that the necessary cycling sequence can be carried out in various ways by those skilled in the art by resort to obvious expedients forming no part of the present invention. For example, pedal depression to a given extent can be used to turn on the sonic oscillator, as by closing a circuit energizing a solenoid which controls the valve feeding air to the oscillator, and by then further depressing the pedal, after a suitable interval, the welding current can be switched on. Or, the pedal can be depressed to an operating position at which the sonic oscillator is turned on and a welding circuit also switched closed, the circuit containing, however, a delay means to give time for the sonic cleaning operation prior to sending the welding current to the work. It will also be clear that automatic circuit means may be incorporated to terminate the sonic vibration after a suitable time interval, or that the sonic oscillator can simply be turned off manually after its work is done.

Thus, whatever the system actually used in practice, following clamping of the work pieces and application of suitable pressure thereto, the sonic oscillator is then operated to set up the standing wave in the arm 20, as earlier described, the arm thus functioning as an elastically vibratory resonator. Vibration at the rearward end of the arm 20 is not transmitted to the pedal because of flexibility in the linkage and loose fits at the pivot joints.

At the upper electrode tip, the motion produced has a resonantly amplified component substantially normal to the contacting surfaces of the work pieces, as well as a component oriented parallel to the arm 20, but which is of low amplitude owing to nonresonant vibration in that direction. The resultant motion path is actually an ellipse, generally and preferably relatively flat, whose long axis is normal to the contacting surfaces of the work pieces.

Assume now a pair of work pieces such as 37 and 38 to be gripped and held tightly between the electrodes, and the oscillator 40 to be driven at the resonant frequency of the arm 20 to obtain the desired standing wave pattern. It will be understood, of course, that resonant frequency is attained by controlling the feed of driving fluid to the oscillator, and that the presence of resonance is easily recognized by large amplification of vibration amplitude. Resonant standing wave vibration having been established, sonic energy is thereby delivered from the electrode 35 to the restricted or concentrated areas of the work pieces which are to be welded together, and the sonic energy level attains and maintains a magnitude such that violent vibratory activity takes place. Such vibratory activity occurs between the upper electrode and the contacting surface of the upper work piece, between the two work pieces, and between the lower work piece and the lower electrode. Relative vibratory motion takes place between each successive pair of surfaces because of mismatch of acoustic impedances from surface to surface, sonic reflections, and resulting activities such as vibration amplitude differentials and phase differences, all of which in turn result in rapid removal of the initial coatings. In FIG. 6, for example, the contacting work pieces 37 and 38 are shown to have original insulation coatings c, and these are rapidly scrubbed, abraded, broken up, cracked and scaled, or otherwise removed by the violent sonic activity, leaving bare metal as at m.

As the coating is being removed, or immediately that base metal is exposed in the contacting areas, the welding current is flashed through, forming the spot-weld as indicated at w in FIG. 6.

The elastic stiffness and vibration transmission characteristics of the work pieces can undergo fairly substantial changes in some cases during the removal of the coating and the resulting more intimate contact of the work pieces, and, for reasons explained heretofore, the preferred orbiting-mass energizing oscillator has the advantage that it automatically accommodates itself to such changes, and thus maintains the flow of sonic energy at a high level throughout. The time interval required for the sonic removal of the coating can be quite short in relation to the welding current flow interval, so that there is no material delaying of the welding operation by the sonic coating removal step.

FIG. 7 shows a modification of a portion of FIG. 5, and shows somewhat diagrammatically a case in which the orbiting-mass oscillator 40a is mounted on the arm 20a with its orbiting inertia ring 48a and pin 46a parallel to the arm 20a, so that the gyratory motion takes place in planes transversely of the arm 20a. In other respects, the machine may be identical to that of FIGS. 1–5. In this case, a rotating force vector is created which applies to the arm a rotating force turning constantly about an axis parallel to the arm. A gyratory type of lateral standing wave is thereby obtained, such as is fully described in my prior Patent No. 2,960,314, to which reference may be had for further understanding. In this case, the vibratory motion applied to the surface of the work piece contacted by the electrode is primarily in the plane of the surface of the work piece. This periodic scrubbing or scraping motion can be used alternately with or alternatively to that first described, depending upon the physical characteristics of the coating.

The invention is also applicable to spot welding operations wherein two parts are not placed in contact with one another between electrodes of a spot-welding machine, but instead, a welding electrode is applied to a work piece which is to be welded to another, the latter being, for example, electrically grounded, while the electrode is electrically energized.

The invention is also applicable to a system (FIG. 8) wherein sonic vibration is applied to a coated area of a member m to be welded to another member n at a sonic vibration station s, where the coating removal is accomplished, and the members then indexed ahead to bring them to a welding station, where the sonically cleaned areas are then situated at the welding electrodes, at w, and the welding current flashed through. During this welding current flow, the members m and n may be having their coating or coatings being removed at the preceding sonic vibration station. Since the time interval for spot-welding is normally less than that for coating removal by sonic vibration, there may advantageously be a number of simultaneously operating sonic vibration stations s spaced the indexing distance apart, such that the sonic vibration treatment for each weld spot is applied several times, once at each sonic station, and the welding then accomplished at the final welding station. In such cases, the welding electrodes, such as indicated at e in FIG. 8, may be conventional, and the sonic vibration stations, such as at s in FIG. 8, may be of the type shown in FIGS. 1–7, but with the electrical energization omitted.

Certain illustrative embodiments of the invention have now been described and illustrated, but it will be understood that these are for illustrative purposes only, and the various changes in design, structure and equipment may be made without departing from the spirit and scope of the appended claims.

I claim:
1. The method of removal of an insulating surface coating from an area of a member and welding said area, that comprises:
   contacting an area of said member by vibratory output coupling element of an elastically vibratory resonator in combination with a welding electrode;
   driving a mass repeatedly around a closed orbital path at a resonant frequency of said resonator;
   confining said mass to movement in said path and thereby creating a periodic impulse;
   impressing said periodic impulse on said resonator whereby to set said resonator into elastic resonator vibration, and thereby cause vibratory movement of said output coupling element of said resonator relative to said member to be spot welded; and
   passing current through said electrode to weld said area.

2. In a spot welding machine, the combination of:
   a welding electrode adapted to contact a coated part to be spot welded;
   means for effecting relative sonic vibration between said electrode and said part to remove said coating, embodying an elongated elastically vibratory bar adapted to have transverse resonant standing wave vibration set up therein, characterized by nodes and antinodes;
   said electrode being mounted on said bar at a vibratory portion thereof; and
   a mechanical oscillator coupled to said bar in the region of an antinode of said standing wave.

3. In a spot-welding machine including means for removal of an insulating coating from an area of a member to be spot welded, the combination of:
   an electrode arranged for delivering welding current to said area;
   an elastically vibratory resonator having a resonant frequency;
   a vibratory output element on a vibratory portion of said resonator adapted for engagement with said member;
   a mechanical oscillator coupled to a vibratory portion of said resonator, said oscillator comprising a bearing means fixed to a vibratory portion of said resonator to vibrate therewith;
   an inertia rotor guided by said bearing means for turning in an orbital path; and
   driving means for driving said rotor in said orbital path at a frequency in the range of said resonant frequency of said resonator.

4. The subject matter of claim 3, wherein said resonator comprises an elongated elastic bar adapted to have a transverse resonant standing wave set up therein, characterized by nodes and antinodes, with said oscillator connected to said bar in the region of an antinode of said standing wave, and said electrode connected to said bar in the region of an antinode of said standing wave.

5. The subject matter of claim 2, wherein said oscillator is of an orbiting-mass type.

6. The subject matter of claim 5, wherein said orbiting-mass oscillator embodies a mass which travels in an orbit about an axis contained in a plane at right angles to said bar.

7. The subject matter of claim 5, wherein said orbiting-mass oscillator embodies a mass which travels in an orbit about an axis parallel to said bar.

References Cited by the Examiner

UNITED STATES PATENTS

| | | | |
|---|---|---|---|
| 2,222,906 | 11/1940 | Hentzen | 219—86 |
| 2,805,320 | 9/1957 | Palic | 219—108 |
| 2,846,563 | 8/1958 | Cronin | 219—86 |
| 2,847,556 | 8/1958 | Brennen et al. | 219—86 |
| 3,117,768 | 1/1964 | Carlin | 219—72 X |

RICHARD M. WOOD, *Primary Examiner.*